United States Patent
Van Phan et al.

(10) Patent No.: US 9,521,683 B2
(45) Date of Patent: Dec. 13, 2016

(54) DEVICE TO DEVICE COMMUNICATIONS

(75) Inventors: Vinh Van Phan, Oulu (FI); Ling Yu, Oulu (FI); Kari Veikko Horneman, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/390,271

(22) PCT Filed: Apr. 5, 2012

(86) PCT No.: PCT/EP2012/056260
§ 371 (c)(1),
(2), (4) Date: Oct. 2, 2014

(87) PCT Pub. No.: WO2013/149665
PCT Pub. Date: Oct. 10, 2013

(65) Prior Publication Data
US 2015/0065154 A1 Mar. 5, 2015

(51) Int. Cl.
*H04W 72/08* (2009.01)
*H04W 4/00* (2009.01)
*H04W 76/02* (2009.01)
*H04W 72/04* (2009.01)

(52) U.S. Cl.
CPC ........... *H04W 72/085* (2013.01); *H04W 4/005* (2013.01); *H04W 72/042* (2013.01); *H04W 76/023* (2013.01)

(58) Field of Classification Search
CPC .... H04W 72/082; H04W 72/04; H04W 28/18; H04W 24/00; H04W 72/085; H04W 4/005; H04W 72/042; H04W 76/023
USPC .................. 370/312, 239, 336; 455/450–453
See application file for complete search history.

(56) References Cited

U.S. PATENT DOCUMENTS

| | | | | |
|---|---|---|---|---|
| 6,192,247 | B1 * | 2/2001 | Dillon | H04W 56/0005 455/446 |
| 6,996,374 | B1 * | 2/2006 | Bao | H04W 24/02 455/423 |
| 8,014,783 | B2 * | 9/2011 | Seidel | H04W 72/085 455/450 |
| 8,175,032 | B2 * | 5/2012 | Olfat | H04L 5/0007 370/328 |

(Continued)

FOREIGN PATENT DOCUMENTS

WO 2011/147468 A1 12/2011

OTHER PUBLICATIONS

ETSI TS 136 300 V10.7.0 (Mar. 2012), LTE, Evolved Universal Terrestrial Radio Access (E-UTRA) and Evolved Universal Terrestrial Radio Access Network (E-UTRAN), Overall description, Stage 2 (3GPP TS 36.300 version 10.7.0 Release 10).

(Continued)

*Primary Examiner* — Sharad Rampuria
(74) *Attorney, Agent, or Firm* — Brake Hughes Bellermann LLP

(57) ABSTRACT

In a network controlled device to device service a reference radio bearer that would provide an adequate service in a cellular access mode is determined. Information of semi-static resource allocation is then determined for the reference radio bearer and signalled to at least one device for use in configuring the at least one device for device to device communications. The at least one device can use the information as guidance when configuring for device to device communications.

28 Claims, 2 Drawing Sheets

(56) References Cited

U.S. PATENT DOCUMENTS

| | | | | |
|---|---|---|---|---|
| 8,588,803 B2* | 11/2013 | Hakola | ............... | H04W 72/085 370/310.2 |
| 8,873,455 B2* | 10/2014 | Speight | ................ | H04W 88/04 370/315 |
| 9,049,702 B2* | 6/2015 | Baker | ............... | H04W 72/0406 |
| 9,094,910 B2* | 7/2015 | Wu | .................... | H04W 56/0045 |
| 2009/0268693 A1* | 10/2009 | Lindh | ................ | H04W 72/042 370/336 |
| 2010/0255855 A1* | 10/2010 | Sabat, Jr. | .............. | H04W 16/14 455/450 |
| 2011/0268006 A1* | 11/2011 | Koskela | .............. | H04W 72/121 370/312 |
| 2011/0282989 A1* | 11/2011 | Geirhofer | ............. | H04W 28/18 709/224 |
| 2011/0312331 A1* | 12/2011 | Hakola | ............... | H04W 72/085 455/452.2 |
| 2014/0010180 A1* | 1/2014 | Lee | ....................... | H04W 48/02 370/329 |
| 2014/0010209 A1 | 1/2014 | Hakola et al. | | |
| 2014/0307621 A1* | 10/2014 | Frenger | ............. | H04W 28/0215 370/328 |
| 2014/0329516 A1* | 11/2014 | Falconetti | ............. | H04W 48/20 455/418 |
| 2014/0349660 A1* | 11/2014 | Abdalla | ................ | H04W 4/005 455/450 |
| 2014/0376454 A1* | 12/2014 | Boudreau | ............. | H04W 24/02 370/329 |
| 2014/0376461 A1* | 12/2014 | Park | ....................... | H04W 16/14 370/329 |
| 2015/0215911 A1* | 7/2015 | Dimou | .................. | H04W 48/12 370/329 |
| 2015/0326359 A1* | 11/2015 | Subramanian | ........ | H04L 5/0023 370/330 |
| 2015/0351135 A1* | 12/2015 | Schmidt | ................ | H04W 76/02 455/450 |
| 2016/0029388 A1* | 1/2016 | Ali | ..................... | H04W 72/1278 370/329 |

OTHER PUBLICATIONS

3GPP TS 36.331 V10.5.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 10).

3GPP TS 36.321 V10.5.0 (Mar. 2012) 3rd Generation Partnership Project; Technical Specification Group Radio Access Network; Evolved Universal Terrestrial Radio Access (E-UTRA); Medium Access Control (MAC) protocol specification (Release 10) 56 pages.

3GPP TS 36.213 V10.5.0 (Mar. 2012), 3rd Generation Partnership Project; Technical Specification Group Radio Access Network; Evolved Universal Terrestrial Radio Access (E-UTRA); Physical layer procedures (Release 10).

International Search Report and Written Opinion for International Application No. PCT/EP2012/056260, mailed Aug. 16, 2012, 13 pages.

* cited by examiner

DEVICE TO DEVICE COMMUNICATIONS

CROSS-REFERENCE TO RELATED APPLICATIONS

This application is a national stage entry of PCT Application No. PCT/EP2012/056260, filed on Apr. 5, 2012, entitled "DEVICE TO DEVICE COMMUNICATIONS", which is hereby incorporated by reference in its entirety.

BACKGROUND

This disclosure relates to device to device communications and more particularly to use of resources in a system enabling wireless device to device communications.

A wireless communication system can be seen as a facility that enables communication sessions between two or more nodes such as fixed or mobile wireless devices, user equipment, machine type terminals, access points such as base stations, and so on. A wireless device is provided with an appropriate signal receiving and transmitting arrangement for enabling communications with other parties. A communication system and compatible devices typically operate in accordance with a given standard or specification which sets out what the various entities are permitted to do and how that should be achieved. For example, the standards, specifications and related protocols can define the manner how and what the devices shall communicate with, how various aspects of the communications shall be implemented and how the devices shall be configured. Examples of wireless systems include public land mobile networks (PLMN) such as cellular networks, satellite based communication systems and different wireless local networks, for example wireless local area networks (WLAN). Examples of wireless systems are those based on standards by the 3rd Generation Partnership Project (3GPP). Recent 3GPP developments are referred to as the long-term evolution (LTE) and the LTE-Advanced (LTE-A) of the Universal Mobile Telecommunications System (UMTS) radio-access technology.

A type of communication services is known as the Device-to-device (D2D) communications where two or more devices can directly communicate with each other. Examples of D2D communications include direct communications in a cluster of proximity devices, integrated network-controlled D2D communications and autonomous D2D communications in cellular network, grid/group of local machines communicating with each other while performing certain tasks in co-operative way, ad-hoc networks and advanced cellular devices acting as a gateway for a number of low-capability devices or machines to access cellular network. Examples of alternative terms for such communications include mobile-to-mobile (M2M), machine-to-machine (M2M), terminal-to-terminal (T2T) or peer-to-peer (P2P) communications.

D2D communications can be network controlled. In network controlled D2D solutions the individual devices may have cellular and/or D2D radio bearers configured. The cellular bearers can comprise at least some default signalling bearers. In certain circumstances a D2D mode and D2D radio bearer (RB) services are believed to provide a better performance in terms of e.g. resource utilization, network performance and/or end-user experienced quality of service (QoS) than what might be achieved by using a regular cellular access mode and radio bearer services thereof. Depending on user cases, user traffic may remain local between the devices e.g. in direct D2D for end-to-end (E2E) applications or be routed through a serving access network to devices connected to wider communication system, for example in relay or mobile gateway applications. Furthermore, D2D communications may be provided as an in-band service which shares the same radio resource as regular cellular transmissions, or as an off-loaded out-band service which does not interfere with the regular cellular transmissions.

In accordance with a prior art proposal a reference bearer service model can be used for network controlled D2D communications with help of a multi-operator coordinating-and-controlling central server. Another proposal is that a network can configure QoS parameters for a D2D radio bearer with allowable variations so that D2D devices can then adjust their D2D protocol operation modes by themselves including radio link control (RLC) mode selection, hybrid automatic repeat request (HARQ) settings and power control.

The inventors, however, have found that these may not work satisfactorily in all circumstances. For example, it might be desirable for QoS provisioning and control functions for D2D radio bearer services to be able to ensure fast switching between a D2D mode and a regular cellular access mode. Also, in certain applications flexible resource allocation and/or adaptation to D2D radio transmissions as well as use cases or applications might be desired. Overhead for a cellular network controlling the D2D services should also be kept on reasonable levels.

It is noted that the above discussed issues are not limited to any particular communication environment and station apparatus but may occur in any appropriate system where network assisted device to device communications may be provided.

SUMMARY

Embodiments of the invention aim to address one or several of the above issues.

In accordance with an embodiment there is provided a method for controlling device to device communications, comprising determining a reference radio bearer that would provide an adequate service in a cellular access mode, determining information of semi-static resource allocation for the reference radio bearer, and signalling the information of semi-static resource allocation for the reference radio bearer to at least one device for use in configuring the at least one device for device to device communications.

In accordance with an embodiment there is provided a method for device to device communications, comprising obtaining at a device information of semi-static resource allocation for a reference radio bearer determined to provide an adequate service in a cellular access mode, and using the information of semi-static resource allocation as guidance when configuring the device for device to device communications.

In accordance with an embodiment there is provided an apparatus for a network enabling device to device communications, the apparatus comprising at least one processor, and at least one memory including computer program code, wherein the at least one memory and the computer program code are configured, with the at least one processor, to determine a reference radio bearer that would provide an adequate service in a cellular access mode, determine information of semi-static resource allocation for the reference radio bearer, and cause signalling of the information of semi-static resource allocation for the reference radio bearer to at least one device for use in configuring the at least one device for device to device communications.

In accordance with an embodiment there is provided an apparatus for a wireless device, the apparatus comprising at least one processor, and at least one memory including computer program code, wherein the at least one memory and the computer program code are configured, with the at least one processor, to obtain at a device information of semi-static resource allocation for a reference radio bearer determined to provide an adequate service in a cellular access mode, and use the information of semi-static resource allocation as guidance when configuring the device for device to device communications.

In accordance with a further embodiment an updated semi-static resource allocation can be determined based on updated information on relevant devices. The updated information on devices may comprise information on channel conditions and/or connection statuses of devices involved in the device to device communications.

A determined reference radio bearer configuration may be signalled to the at least one device.

Information of at least one of a device to device service specific indicator, an offset and a threshold may be signalled to at least one device for use in configuring the device for device to device communications.

It may be determined that device to device communications are available for end-to-end communications between at least two devices. After the determination switching from the cellular access mode to the device to device communications can take place. The reference radio bearer can be determined based on a radio bearer provided for the end-to-end communications in the cellular access mode.

Switching between the cellular access mode and device to device communications may be based on information on a radio network temporary identity.

At least one device to device enabled device may be configured for reporting information associated with the reference radio bearer and semi-static resource allocation thereof.

A trigger for reporting and/or switching by a device to device enabled device may be provided.

The at least one device may report information associated with a detected performance of a device to device link relative to an expected performance of a device to device link configured based on the reference radio bearer or a radio bearer in the cellular access mode.

Link budget parameters may be determined for device to device communications based on the information of semi-static resource allocation for the reference radio bearer.

A device and a base station embodying the invention may also be provided. A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings, in which.

DETAILED DESCRIPTION

In the following certain exemplifying embodiments are explained with reference to a wireless or mobile communication system serving mobile communication devices. Before explaining in detail the exemplifying embodiments, certain general principles of wireless communications are briefly explained with reference to FIGS. 1 and 2 to assist in understanding the technology underlying the described examples.

A non-limiting example of the recent developments in communication system architectures is the long-term evolution (LTE) of the Universal Mobile Telecommunications System (UMTS) standardized by the 3rd Generation Partnership Project (3GPP). More recent development of the LTE, Release 10 and upwards, are sometimes referred to as LTE-Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the wireless devices. Other examples of radio access system include those provided by base stations of systems that are based on technologies such as wireless local area network (WLAN) and/or WiMax (Worldwide Interoperability for Microwave Access).

Figure 1:
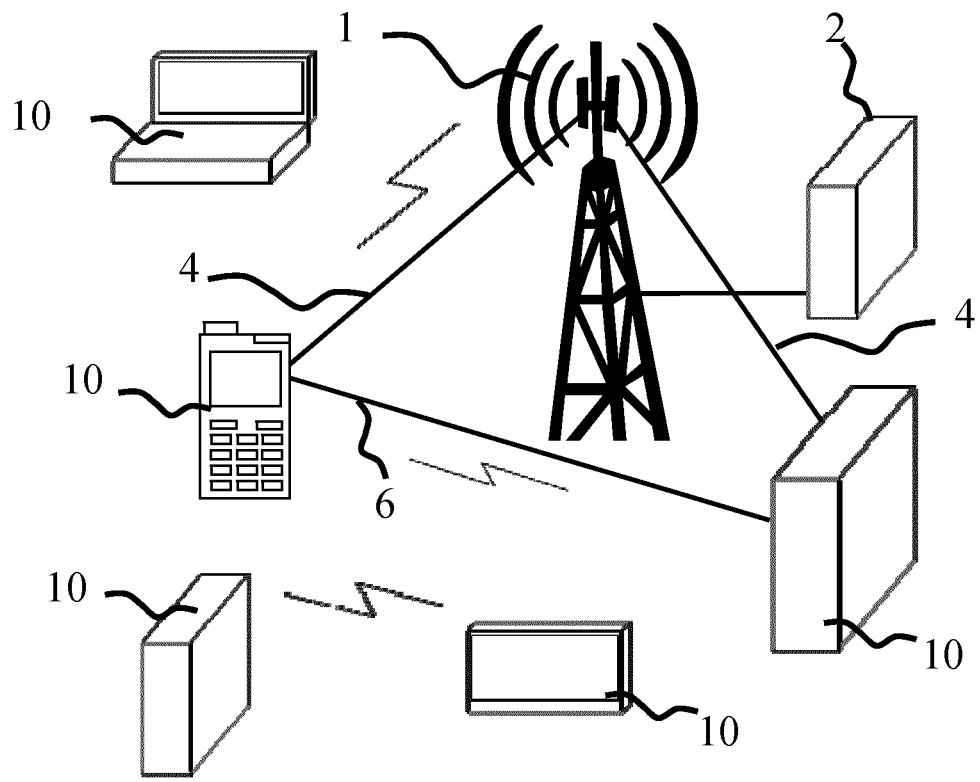
FIG. 1 shows schematically a system where the invention may be embodied.

Wireless communication devices 10 can be provided with wireless access via base stations 1 or similar wireless transmitter and/or receiver nodes providing radio service areas or cells. The access may be provided for example for communication with at least one other device or e.g. for internet access. The base stations can be connected to a core communications network via appropriate gateways and/or backhaul systems. In FIG. 1 end-to-end communications between two devices via cellular access is denoted by line 4. Furthermore, the wireless devices 10 may communicate directly with each other when in a device to device (D2D) mode. The D2D communications is denoted by line 6. The network can provide control on the device to device (D2D) communications. Examples of D2D communications and network control thereof were given above. A mobile communication system typically comprises further nodes, for example elements such as mobility management entity (MME) 2, subscriber databases and so on. The devices of FIG. 1 can thus be provided with different access modes for communications.

A default rule may be that the devices communicate with each other for a requested service using the regular cellular access mode. If it is determined by the network that a D2D mode is applicable and would be more appropriate e.g. based on a predefined criterion for providing the requested service, then the network may determine and control switching to the D2D mode. For example, the D2D mode may be selected because it is considered more appropriate in terms of resource utilization, performance and/or quality of service (QoS) and so on.

Figure 2:
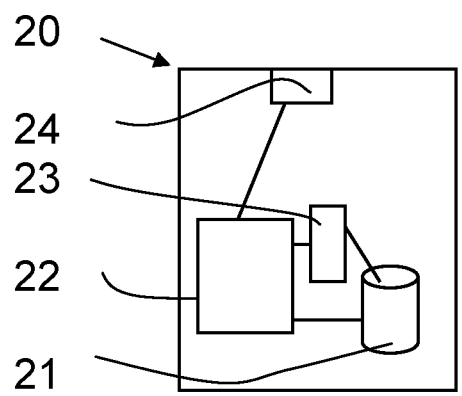
FIG. 2 shows a schematic diagram of a control apparatus according to some embodiments.

Wireless devices and base stations are typically controlled by at least one appropriate controller apparatus so as to enable operation thereof and control of wireless communications between the devices and/or the base station. The control apparatus can be interconnected with other control entities. FIG. 2 shows an example of a control apparatus 20 capable of operating in accordance with the embodiments, for example to be coupled to and/or for controlling the base station node 1 or a wireless communication device 10. It is noted in relation to base station control that the relevant control apparatus can be located another network element that the transceiver station.

The control apparatus 20 can be configured to provide control functions in association with determination of various information, generation and communication of information between the various entities and/or control functions based on such information by means of the data processing facility in accordance with certain embodiments described below. For this purpose the control apparatus comprises at least one memory 21, at least one data processing unit 22, 23 and an input/output interface 24. The control apparatus can be coupled to a receiver and/or transmitter of the relevant node via the interface. The control apparatus can be configured to execute an appropriate software code to provide the control functions. The control apparatus and functions may be distributed between a plurality of control units.

A wireless communication device, such as a base station and/or other wireless device or station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antenna elements.

As mentioned above, two devices can setup a device to device radio bearer (D2D RB). Communications can then take place directly between the devices for an end-to-end (E2E) service. The devices may already communicate with each other for the same E2E service via at least one base station based on a regular cellular access mode. Therefore normal radio bearers may have been setup for the devices. When it is determined that D2D service is available the normal radio bearer may be used as a reference/virtual radio bearer, for example for the purposes of quality of service (QoS) provisioning of the D2D RB.

A reference/virtual radio bearer for a D2D service having the same characteristics as the regular radio bearer defined for cellular access mode may be determined. The reference bearer can be based on a regular cellular-access radio bearer which has been used/applied for providing end-user service for the devices for example when D2D service was not considered as suitable. The reference bearer can be used if the D2D mode is determined to be available for use and configured for given communications. Use of the D2D mode may involve a switch from the regular cellular access mode to the D2D mode under control of the network.

Figure 3:
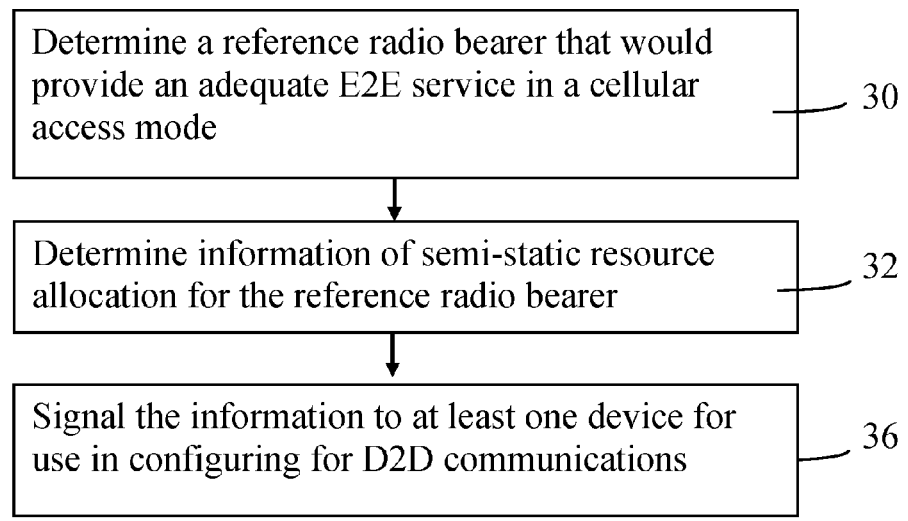
FIGS. 3 and 4 show flowcharts according to certain embodiments.

In accordance with an embodiment shown by the flowchart of FIG. 3 a method is provided for controlling device to device communications by a network apparatus of a wireless system. At 30 a reference radio bearer that would provide an adequate service in a cellular access mode is determined. Information of semi-static resource allocation for the reference radio bearer is then determined at 32. The information of semi-static resource allocation for the reference radio bearer is signalled at 34 to at least one device to device service enabled device for use in configuring the at least one device for device to device communications.

Figure 4:
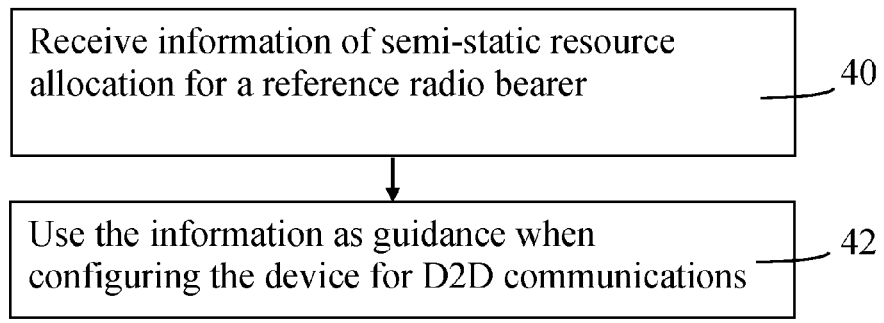

FIG. 4 relates to operations in accordance with an embodiment at a device that is enabled for device to device communications. The device can obtain at 40, for example receive from a base station or other access node of a network, information of semi-static resource allocation for a reference radio bearer. As mentioned above, the resource allocation is such that it is determined to provide an adequate service in the cellular access mode. The information of semi-static resource allocation can then be used at 42 as guidance when configuring the device for device to device communications.

In accordance with an embodiment a reference radio bearer configuration may be determined at the network and signalled to the at least one device for use in configuring for D2D service.

A more detailed embodiment relates to quality of service (QoS) provisioning and control for device to device (D2D) radio bearer (RB) in arrangements where LTE based network control is provided for the D2D communications. In the examples semi-static resource allocation of E-UTRAN is provisioned or derived for a reference or virtual regular radio bearer that would have been applied for providing adequate QoS for a corresponding on-going end-to-end (E2E) service between the devices if the E2E service had used the regular cellular access mode. The virtual reference or guiding radio bearer is referred to herein as a D2D-guiding virtual RB'. The device to device enabled devices can then apply the configured semi-static allocation as a specified guiding link budgets or constrained link budgets for D2D transmissions. According to a possibility the allocation is used otherwise as a specified guidance by the device.

Link budgeting may be provided in a communication system for configuration of a link to take into account various variables affecting the quality of the link. A link budget can be considered as a count of gains and losses from a transmitter, through a medium to a receiver. It can account for the attenuation of the transmitted signal due to propagation, as well as the antenna gains, interference and miscellaneous losses.

A controlling or serving network can derive configurations for a D2D-guiding virtual RB based on bearer service configuration parameters of a user. These can be configured by the serving network side. The serving network may comprise entities such as the serving mobility management entity (MME) 2 and an eNB 1 of FIG. 1. For example, a serving MME may be used for providing the configuration as it typically determines and initiates bearer configurations in the regular cellular access mode. A serving eNB may be used for as it directly controls actual radio access, connection and operation. A D2D specific control server may also be provided. Such a specific control server can be provided as a new network functionality when a D2D service is introduced into a cellular network. More than one entity may be involved in providing the information.

A scheduler at the serving eNB, provided e.g. by the apparatus of FIG. 2, can derive proper updated semi-static resource allocation for the D2D-guiding virtual RB. The scheduler can take into account information such as awareness of updated channel conditions and connection statuses of the involved devices.

According to a possibility a serving eNB may signal information of a D2D-guiding virtual RB configuration and the derived updated semi-static resource allocation of the D2D-guiding virtual RB to D2D users. In this case the eNB can have the sole responsibility of initiating and carrying out the configuration and control procedures for a D2D guiding virtual RB, without involvement of e.g. an MME. This information may be signalled together with information such as D2D specific indicator(s), offset(s) and/or threshold(s) corresponding to any applicable and/or controllable parameter of a D2D service. Information for setting features such as link delay, traffic class priority, and/or bearer class priority may also be signalled to the devices. Signalling of virtual radio bearer configuration information to a device may be used to provide flexibility for applying the semi-static resource allocation with the D2D specific indicators and/or offsets and/or thresholds. By means of this as much controllable head room and/or flexibility and adaptability at the device side as possible may be provided for maximizing possible gains of the D2D mode. At the same time, additional complexity and control overhead may be minimized at the network side when supporting D2D services.

An uplink/downlink (UL/DL) assignment transmitted on physical downlink control channel(s) (PDCCH) for either UE's semi-persistent scheduling a Cell Radio Network Temporary identity (C-RNTI) or UE's normal C-RNTI can be used for a fast mode switching between D2D mode and regular cellular access. A serving eNB can use a semi-persistent scheduling C-RNTI for a D2D enabled device or some D2D specific C-RNTI which is assigned for a D2D link or a D2D group/cluster for signalling an allocation related to the D2D service. According to a possibility a normal C-RNTI of an user equipment may be used for signalling allocation related to cellular access of the users.

A serving eNB may configure D2D devices for performing operations such as physical control, measurement and reporting in relation to a D2D-guiding virtual RB configuration and semi-persistent resource allocation thereof. This can be provided to reduce protocol overhead and/or facilitate fast update and/or mode switching from D2D mode back to regular cellular access when needed. The configuration can include for example triggers for reporting from D2D devices. Triggering may be configured to occur e.g. in response to detection that relative spectral- and/or energy efficiency gains against what is expected with the configured D2D guiding virtual RB or regular mode drops below a minimum threshold. The serving eNB may also fast modify (configure) the virtual RB to become an actual RB upon mode switching or communicating with the devices. This can be provide e.g. by means of the above discussed PDCCH based mechanism.

Devices using a D2D service, or at least a master or cluster head device, can derive link budget parameters for D2D transmissions based on the received information of D2D-guiding virtual RB configuration and the updated semi-static resource allocation. For example, maximum allowed Tx-Power on the D2D service can be set by a Tx-Power parameter that might have been momentarily set for a transmission of the D2D-guiding virtual RB on the configured semi-static resource allocation in the regular cellular access mode. The parameter may be adjusted with corresponding D2D specific offset if one is configured. Further, minimum or average or maximum bit rate and/or throughput on D2D service can be set based on a corresponding bit rate derived from the received semi-static resource allocation. Again, this can be adjusted with a corresponding D2D specific offset, if this is configured. Other examples of parameters that can be set include link delay, traffic class priority, and/or bearer class priority.

D2D devices, or at least a master or cluster head, can configure and control protocol operation and transmission modes on the D2D service autonomously. Use of the service is constrained by the derived link budgets. The devices do not need to follow strictly what is set in the configured semi-static resource allocation. For example, layer 1 (L1) Modulation and Coding Scheme (MCS) on a D2D link can be decided locally by the devices based on derived maximum allowed Tx-Power and channel conditions of the D2D link instead of strictly following what is set for the configured semi-static resource allocation for the D2D-guiding virtual RB.

L2 layering structure, mode and operation can also be flexibly configured and optimized together with L1 for fulfilling the link budgets. For instance, a D2D service may choose to omit a radio link control (RLC) sub-layer to simplify operation thereof.

D2D devices can monitor and report D2D link performance compared to what is expected with the configured D2D-guiding virtual RB or regular mode, for example according to network configured rules. The reporting may include information such as gain on spectral and/or energy efficiency.

Time division duplexing (TDD) can be applied to D2D communications. Network-controlled in-band D2D may be preferred in certain applications to operate in uplink band of a serving cellular network.

Existing scheduling of semi-static resource allocation, signalling and power control functions, such as those described in 3GPP TS 36.300 version a70, 36.331 version a50 and 36.213 version a50 may be used as a base for reconfiguration of a D2D-guiding virtual RB and semi-persistent scheduling (SPS) thereof for the purposes of D2D communications. An appropriate entity in the network, in this example a serving eNB, may take capabilities and conditions of individual devices into considerations to derive unified, or at least harmonized D2D-guiding virtual RB configurations and semi-persistent scheduling. Optional D2D specific offsets may be included for the D2D communications. The link budgets as well as allocations may be updated as frequently as required, for example when a new allocation is signalled on PDCCH(s) overriding the last one.

It is noted that whilst embodiments have been described using LTE and LTE Advanced as examples, similar principles can be applied to any other communication system or indeed to further developments with LTE. Thus, instead of LTE, the invention may be applied to other cellular standards as well. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a network apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for controlling device-to-device communications, comprising:
    determining a reference radio bearer which is based on semi-persistent scheduling, wherein the reference radio bearer would provide an adequate service in a cellular access mode,
    determining an information of a semi-static resource allocation for the reference radio bearer,
    determining a device-to-device communications mode specific offset for a link budget parameter,
    signalling a configuration of the reference radio bearer, the information of the semi-static resource allocation for the reference radio bearer and the device-to-device communications mode specific offset for a link budget parameter to the at least one device for use in configuring the at least one device for a device-to-device communications mode, and
    configuring the reference radio bearer to become an actual radio bearer in a cellular access mode upon the at least one device switching modes from the device-to-device communications mode to the cellular access mode.

2. The method according to claim 1, and further comprising:
    determining an updated semi-static resource allocation based on updated information on relevant devices.

3. The method according to claim 2, wherein the updated information on devices comprises:
    information on channel conditions and/or connection statuses of devices involved in the device to device communications.

4. The method according to claim 1, and further comprising signalling information of at least one of a device-to-device service specific indicator, an offset and a threshold to the at least one device for use in configuring the at least one device for device-to-device communications.

5. The method according to claim 1, wherein the configuring comprises:
    configuring the reference radio bearer to become an actual radio bearer in a cellular access mode upon the at least one device switching modes, based on a radio network temporary identity, from the device-to-device communications mode to the cellular access mode.

6. The method according to claim 5, wherein the information of the semi-static resource allocation comprises at least one of:
    the information of the semi-static resource allocation is indicated by at least one of a semi-persistent scheduling cellular radio network temporary identity (C-RNTI) for a device-to-device enabled device, a C-RNTI assigned for a device-to-device link and a C-RNTI assigned for a device-to-device group or cluster, and
    the information of the semi-static resource allocation for cellular access mode is indicated by a regular or cellular access mode C-RNTI of a user equipment.

7. The method according to claim 1, further comprising:
    configuring at least one device-to-device enabled device for reporting information associated with the reference radio bearer and the semi-static resource allocation thereof.

8. The method according to claim 1, further comprising:
    configuring a trigger for reporting and/or switching by a device-to-device enabled device.

9. The method according to claim 1, further comprising:
    reporting by the at least one device information associated with a detected performance of a device-to-device link relative to an expected performance of a device-to-device radio bearer configured based on the reference radio bearer or a radio bearer in the cellular access mode.

10. The method according to claim 1, further comprising:
    determining link budget parameters for device-to-device communications based on the information of the semi-static resource allocation for the reference radio bearer.

11. The method according to claim 1, further comprising configuring the at least one device for device-to-device communications, including:
    setting, for a device-to-device link, at least one of a maximum allowed transmission power, an offset for a maximum allowed transmission power, a bit rate, an offset for a bit rate, a link delay, a traffic class priority, and a bearer class priority.

12. A method for device-to-device communications, comprising:
    obtaining, by a device, a configuration of a reference radio bearer and information of a semi-static resource allocation for the reference radio bearer which is based on semi-persistent scheduling, wherein the reference bearer is determined to provide an adequate service in a cellular access mode,
    receiving, by the device, a device-to-device communications mode specific offset for a link budget parameter,
    configuring the device for the device-to-device communications mode based on the configuration of the reference radio bearer, the information of semi-static resource allocation and the device-to-device communications mode specific offset for the link budget parameter, and
    switching, by the device, a mode from the device-to-device communications mode to the cellular access mode, and applying the reference radio bearer as an actual radio bearer in the cellular access mode.

13. The method according to claim 12, further comprising:
determining an updated semi-static resource allocation based on updated information on relevant devices.

14. The method according to claim 13, wherein the updated information on devices comprises information on channel conditions and/or connection statuses of devices involved in the device to device communications.

15. The method according to claim 12, further comprising:
receiving information of at least one of a device to device service specific indicator, an offset and a threshold to at least one device for use in configuring the device for device-to-device communications.

16. The method according to claim 12, wherein the switching a mode comprises:
switching a mode from the device-to-device communications mode to the cellular access mode based on information on a radio network temporary identity.

17. The method according to claim 12, wherein the information of the semi-static resource allocation comprises at least one of:
the information of the semi-static resource allocation is indicated by at least one of a semi-persistent scheduling cellular radio network temporary identity (C-RNTI) for a device-to-device enabled device, a C-RNTI assigned for a device-to-device link and a C-RNTI assigned for a device-to-device group or cluster, and
the information of the semi-static resource allocation for cellular access mode is indicated by a regular or cellular access mode C-RNTI of a user equipment.

18. The method according to claim 12, further comprising:
configuring at least one device-to-device enabled device for reporting information associated with the reference radio bearer and the semi-static resource allocation thereof.

19. The method according to claim 12, further comprising:
configuring a trigger for reporting and/or switching by a device-to-device enabled device.

20. The method according to claim 12, further comprising:
reporting by the at least one device information associated with a detected performance of a device-to-device link relative to an expected performance of a device-to-device radio bearer configured based on the reference radio bearer or a radio bearer in the cellular access mode.

21. The method according to claim 12, further comprising:
determining link budget parameters for device-to-device communications based on the information of the semi-static resource allocation for the reference radio bearer.

22. The method according to claim 12, wherein configuring the at least one device for device to device communications comprises:
setting, for a device-to-device link, at least one of a maximum allowed transmission power, an offset for a maximum allowed transmission power, a bit rate, an offset for a bit rate, a link delay, a traffic class priority, and a bearer class priority.

23. An apparatus for a network enabling device-to-device communications, the apparatus comprising at least one processor, and at least one memory including computer program code, wherein the at least one memory and the computer program code are configured, with the at least one processor, to cause the apparatus to:
determine a reference radio bearer which is based on semi-persistent scheduling, wherein the reference radio bearer would provide an adequate service in a cellular access mode,
determine an information of a semi-static resource allocation for the reference radio bearer,
determine a device-to-device communications mode specific offset for a link budget parameter,
cause signalling of a configuration of the reference radio bearer, the information of the semi-static resource allocation for the reference radio bearer and the device-to-device communications mode specific offset for a link budget parameter to the at least one device for use in configuring the at least one device for device-to-device communications mode, and
configure the reference radio bearer to become an actual radio bearer in a cellular access mode upon the at least one device switching modes from the device-to-device communications mode to the cellular access mode.

24. The apparatus according to claim 23, wherein the computer program code is further configured to cause the apparatus to determine or use an updated semi-static resource allocation, the updated semi-static resource allocation being based on updated information on relevant devices.

25. An apparatus for a wireless device, the apparatus comprising at least one processor, and at least one memory including computer program code, wherein the at least one memory and the computer program code are configured, with the at least one processor, to cause the apparatus to:
obtain, by a device, a configuration of a reference radio bearer and information of a semi-static resource allocation for the reference radio bearer which is based on semi-persistent scheduling, wherein the reference radio bearer is determined to provide an adequate service in a cellular access mode
receive, by the device, a device-to-device communications mode specific offset for a link budget parameter,
configure, by the device, the device for a device-to-device communications mode based on the configuration of the reference radio bearer, the information of semi-static resource allocation and the device-to-device communications mode specific offset for a link budget parameter, and
switch, by the device, a mode from the device-to-device communications mode to the cellular access mode, and apply the reference radio bearer as an actual radio bearer in the cellular access mode.

26. The apparatus according to claim 25, wherein the computer program code is configured to cause the apparatus to configure at least one device-to-device enabled device for reporting information associated with the reference radio bearer and the semi-static resource allocation thereof.

27. The apparatus according to claim 25, wherein the computer program code is configured to cause the apparatus to determine link budget parameters for device-to-device communications based on the information of the semi-static resource allocation for the reference radio bearer.

28. The apparatus according to claim 25, wherein the computer program code causing the apparatus to configure comprises causing the apparatus to:
set, for a device-to-device link, at least one of a maximum allowed transmission power, an offset for a maximum allowed transmission power, a bit rate, an offset for a bit rate, a link delay, a traffic class priority, and a bearer class priority.

\* \* \* \* \*

UNITED STATES PATENT AND TRADEMARK OFFICE
CERTIFICATE OF CORRECTION

| | |
|---|---|
| PATENT NO. | : 9,521,683 B2 |
| APPLICATION NO. | : 14/390271 |
| DATED | : December 13, 2016 |
| INVENTOR(S) | : Van Phan et al. |

Page 1 of 1

It is certified that error appears in the above-identified patent and that said Letters Patent is hereby corrected as shown below:

On the Title Page

In Column 2, Item (56), under "OTHER PUBLICATIONS", Line 1, delete "Universial" and insert -- Universal --, therefor.

In the Claims

In Column 9, Line 54, Claim 2, delete "and further" and insert -- further --, therefor.

In Column 9, Line 63, Claim 4, delete "and further" and insert -- further --, therefor.

In Column 10, Line 58, Claim 12, delete "for the" and insert -- for a --, therefor.

In Column 12, Line 40, Claim 25, delete "mode" and insert -- mode, --, therefor.

Signed and Sealed this
Ninth Day of May, 2017

Michelle K. Lee
*Director of the United States Patent and Trademark Office*